March 22, 1927.
M. T. WESTON
1,621,915
VARIABLE SPEED DEVICE
Filed April 6, 1922　　4 Sheets-Sheet 3
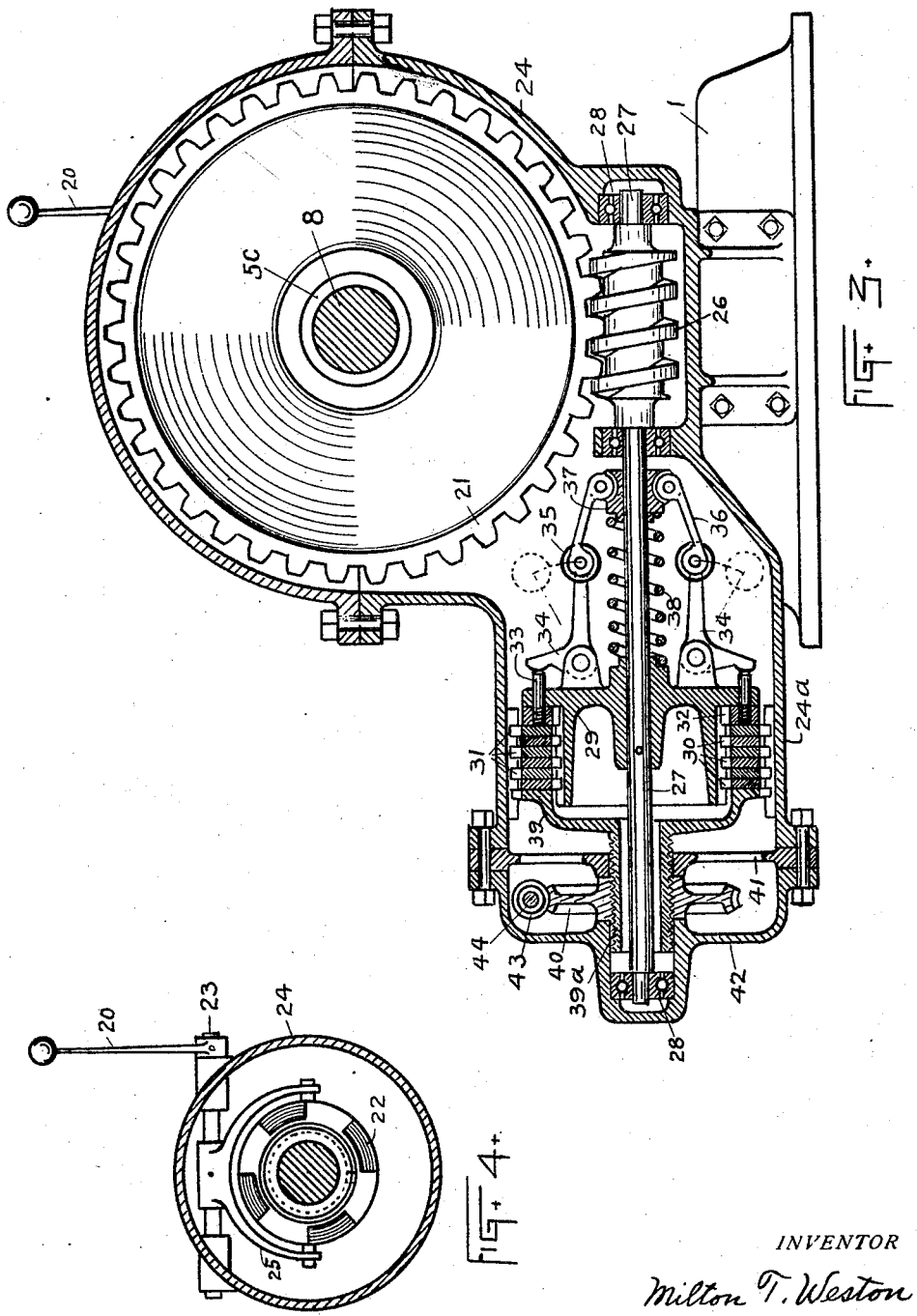
INVENTOR
Milton T. Weston March 22, 1927.  M. T. WESTON  1,621,915
VARIABLE SPEED DEVICE
Filed April 6, 1922   4 Sheets-Sheet 4
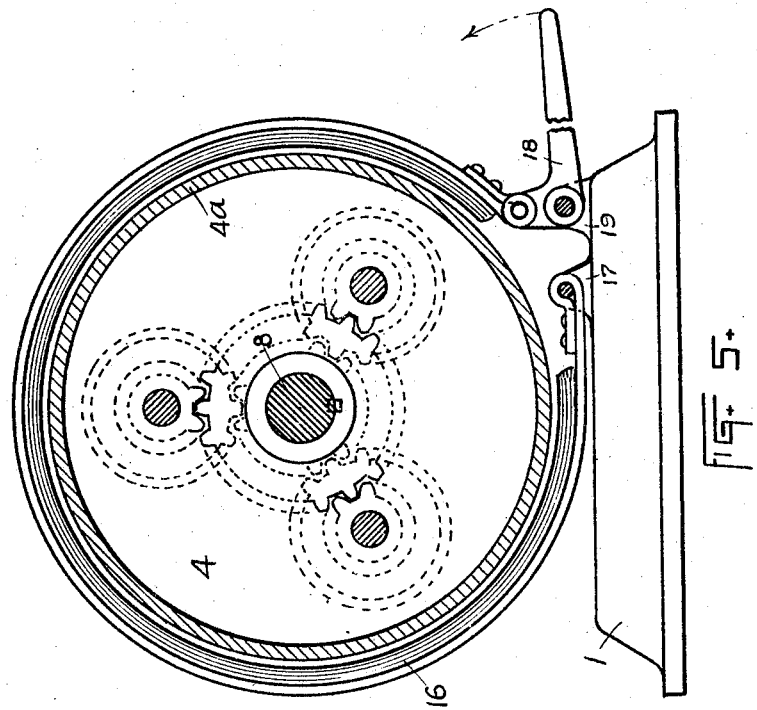
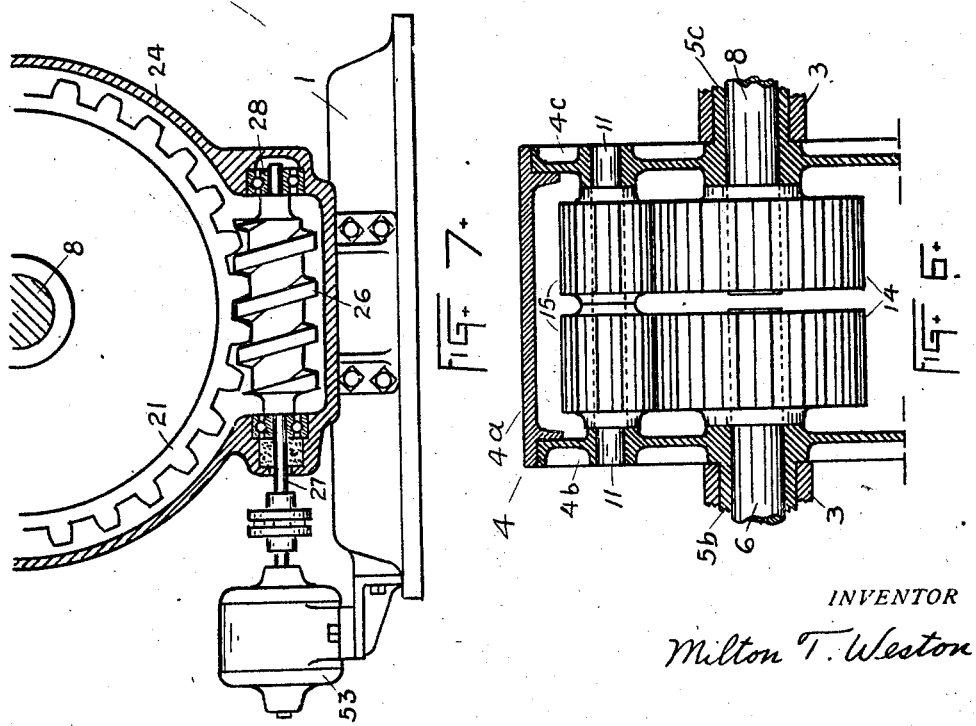
INVENTOR
Milton T. Weston Patented Mar. 22, 1927.

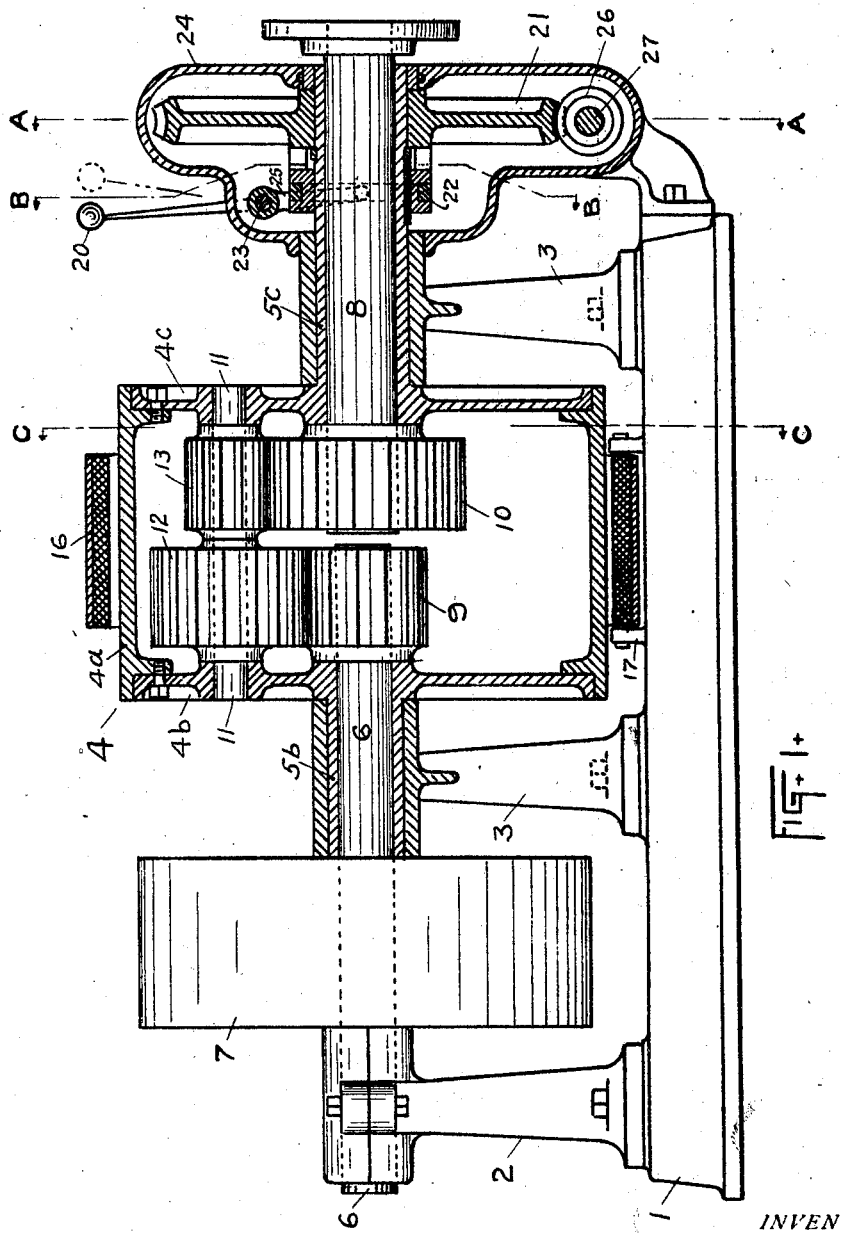

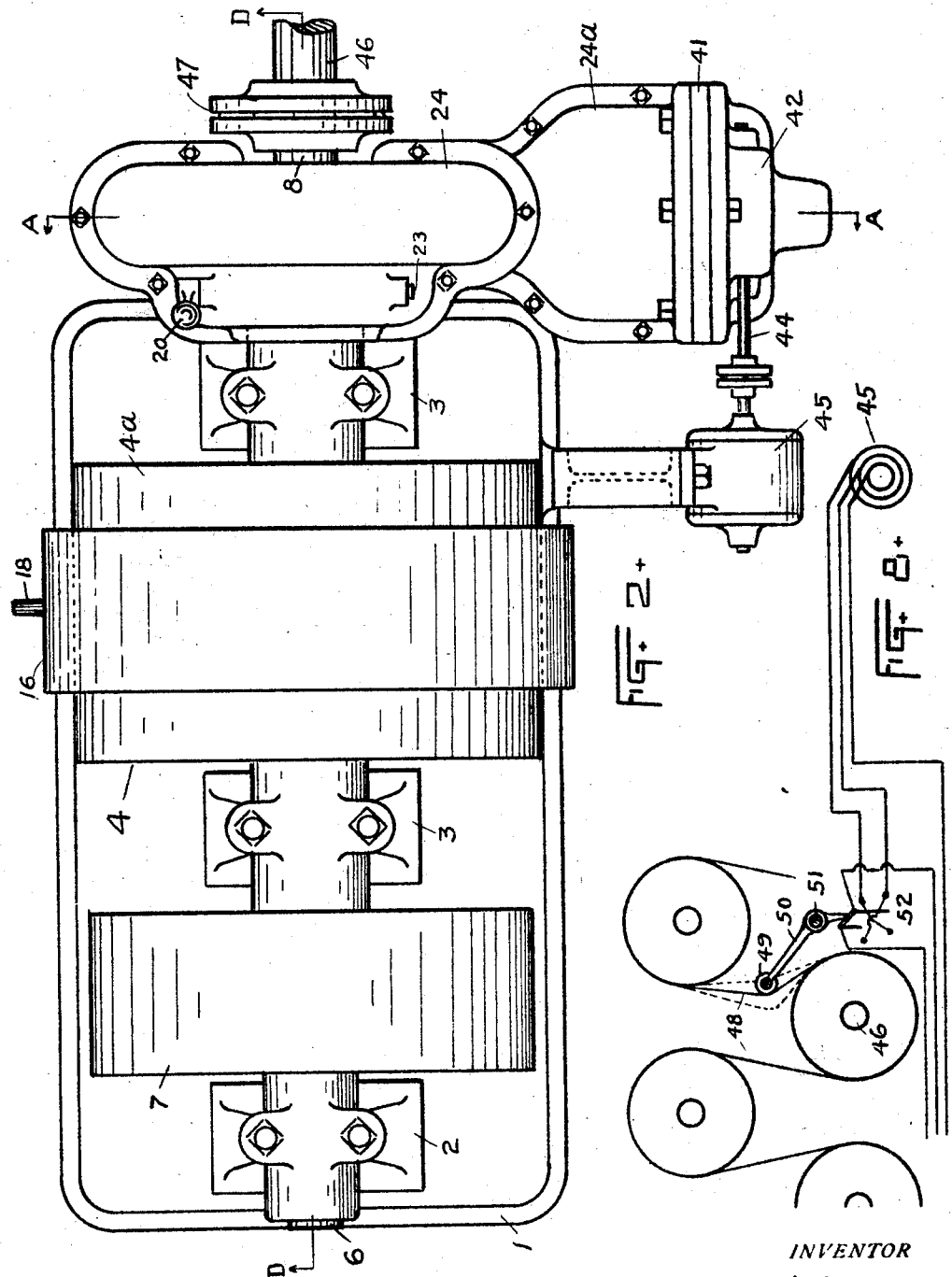

1,621,915

UNITED STATES PATENT OFFICE.

MILTON T. WESTON, OF NEW YORK, N. Y.

VARIABLE-SPEED DEVICE.

Application filed April 6, 1922. Serial No. 550,041.

My invention relates to an improvement in a variable speed device and has for its object to provide a simple, efficient variable speed device, easily adaptable to either automatic or manual control and which will be reliable and sensitive in operation and relatively inexpensive in construction. Other objects and advantages will appear in the following specifications and are clearly shown in the accompanying drawings in which the same numeral refers to similar parts in all the views.

Fig. 1, is a longitudinal cross section on a line D—D of Fig. 2.

Fig. 2, is a plan view of my device.

Fig. 3, is a transverse sectional view on a line A—A of Figs. 1 and 2.

Fig. 4, is a detail cross sectional view taken substantially on a line B—B of Fig. 1, and shows the jaw clutch operator.

Fig. 5, is a transverse sectional view on a line C—C of Fig. 1.

Fig. 6, is a partial sectional view showing a slightly different arrangement of the gears shown in Fig. 1.

Fig. 7, is a partial transverse sectional view showing a modification of the method of control illustrated in Fig. 3.

Fig. 8, is a diagrammatic view illustrating one application of my device.

In carrying out my invention, I provide a base 1, on which are mounted the outboard bearing stand 2, and the main bearing stands 3. A drum or housing 4, comprising a cylindrical shell $4^a$ with end discs $4^b$ and $4^c$, is revolvably mounted in the main bearing stands 3, by means of the trunnions $5^b$ and $5^c$, shown integral with their respective end discs $4^b$ and $4^c$. Projecting through the trunnion $5^b$, and concentric therewith, is a driving shaft 6, having its outer end supported in the outboard bearing stand 2. A belt pulley 7, is shown fixed to the driving shaft 6, between the outboard bearing stand 2, and the adjacent main bearing stand 3. A driven shaft 8 projects through the trunnion $5^c$, and is concentric therewith. It will be understood that the driving shaft 6, and the driven shaft 8, are revolvable in the respective trunnions $5^b$ and $5^c$, and that the drum or housing 4, is also revolvable on the trunnions $5^b$ and $5^c$, in the main bearing stands 3, independent of the said driving and driven shafts.

Within the revolvable housing 4, on the inwardly projecting end of the driving shaft 6, is a pinion 9 and on the adjacent end of the driven shaft 8 is a gear 10, as clearly shown in Fig. 1. Spaced at a distance from the driving shaft 6 and the driven shaft 8, and parallel to them, are auxiliary shafts 11 with their ends journalled in the end discs $4^b$ and $4^c$. On these shafts 11 are fixed the gears 12, meshing with pinion 9 on the driving shaft 6 and also the pinions 13 in mesh with gear 10 on the driven shaft 8. There are preferably 3 sets of shafts 11, gears 12 and pinions 13, equally spaced to give a balanced construction as shown in Fig. 5. It will be obvious that when the revolvable housing 4 is held, in a manner to be described hereinafter, so as not to revolve while the shaft 6 is being driven by the pulley 7, the pinion 9 will impart rotation to the gears 12, resulting in the gear 10 being driven by the pinions 13. The driven shaft 8 will consequently be revolved and at a lower speed than the driving shaft 6, but this speed will be constant with respect to the said driving shaft 6. Therefore, while the housing 4 is held against rotation, the device constitutes a simple speed reducer which is desirable in many cases as it permits the design of the device for the approximate speed desired and obviates the necessity of using additional or extraneous speed reducing apparatus.

In cases where it is not necessary or desirable to reduce the speed of the driven shaft 8, with respect to the driving shaft 6, the arrangement of gears shown in Fig. 6 may be used. In this view, I show gears 14 of equal diameter, on the adjacent ends of the driving shaft 6 and the driven shaft 8, meshing with pinions 15 of equal diameter, mounted on the auxiliary shafts 11 which are journalled in the housing 4. It will be clear that in this construction the driven shaft 8 will revolve at the same speed as driving shaft 6 so long as the housing 4 is held.

However, when the housing 4 is not held against rotation and is free to revolve on its trunnions $5^b$ and $5^c$, the gearing becomes epicyclic and, owing to the resistance of the driven shaft 8 which is the load shaft, the gear 10 becomes substantially fixed and pinions 13 will travel around said gear 10, carrying the housing 4 with them. It will be clear that the housing 4 will revolve at its maximum speed with respect to driving shaft 6 when the driven shaft 8 is held fixed by its load. Conversely, the driven shaft 8 will revolve at its maximum speed with respect to the driving shaft 6 when the revolvable housing 4 is held stationary. From the foregoing it will be seen that the speed of the driven shaft 8 increases from zero revolutions when the housing 4 is free to revolve, to its maximum speed when the said housing 4 is held stationary. Therefore, the speed of the driven shaft 8 varies inversely as the speed of the revolvable housing 4. It is essentially the object of my invention to control the speed of rotation of the revolvable housing 4, thereby attaining a speed for the driven shaft 8, which varies from its normal speed with respect to the driving shaft 6, and to maintain that speed or to vary it at will, either manually or automatically. It is this feature, I believe to be broadly new and which will now be described.

When the housing 4 is free to revolve as explained above, the driven shaft 8 and the machine to which it is connected, are stationary, while the driving shaft 6 is running at full operating speed. When it is desired to start the machine to which my device is connected, the housing 4 is gradually brought to rest in the following manner: A brake band 16, of the usual construction, surrounds the cylindrical shell 4ª, of the housing 4 but is normally free as shown in Figs. 1 and 5. One end of this brake band 16 is fixed to the base 1, at 17, while the other end is attached to the fulcrum lever 18, mounted in lugs 19, on the base 1. Moving the fulcrum lever 18 in the direction indicated in Fig. 5 brings the brake band 16 into circumferential engagement with the revolvable housing 4 and by exerting increasing pressure on the fulcrum lever 18, the housing 4 will be brought gradually to rest while simultaneously the driven shaft 8 and its machine, will be brought gradually to its full working speed. This arrangement of the brake band therefore, performs the function of a friction clutch but in a much more advantageous manner as it does not require additional room and its cost is relatively small as compared to the apparatus it replaces. As long as the housing 4 is gripped by the brake band 16, the machine will be driven at a constant speed with respect to the driving shaft 6. When it becomes desirable or necessary to vary the speed of the machine, the lever 20 is moved from the position shown in dotted lines in Fig. 1, to the position shown in full lines which brings the control device for the housing 4 into operation. The brake band 16 is then released and the control device now governs the rotation of the housing 4 as follows:

A gear 21, shown in the drawings as a worm wheel, is mounted on the extended end of the trunnion 5ᶜ and the said trunnion is revolvable in the said gear 21 while the brake band 16 is in use, as previously described. Moving the lever 20, above mentioned, brings a sliding jaw clutch member 22, splined on the trunnion 5ᶜ, into locking engagement with the jaws on the face of the hub of the gear 21, said gear 21 then being positively revolvable with the housing 4. The method of moving the sliding jaw clutch member 22 is shown clearly in Fig. 4. The lever 20 is mounted on the outer end of the rocker shaft 23, journalled in the gear casing 24. A forked lever 25, secured to the rocker shaft 23, engages the sliding jaw clutch member 22 in the usual manner to impart axial movement to it when the lever 20 is moved as described above. Referring particularly to Fig. 3, I show the worm wheel 21 in engagement with a worm 26, mounted on and secured to a shaft 27 which is carefully aligned in ball bearings 28, in order to minimize the resistance to the rotation of said shaft and also to take care of the thrust of the worm 26. The function of the worm wheel 21 and its mating worm 26 is to restrain and govern the revolution of housing 4 and to offer substantial and positive resistance to the normal tendency of said housing to revolve in order to transmit the required power from the driving to the driven shaft. In order to accomplish this result I choose a worm 26 with a thread angle whose tangent is slightly greater than the coefficient of friction. This permits the worm 26 to be driven by the worm wheel 21, but with very little power both on account of design and because of its low efficiency. It is therefore obvious that very little restraining or holding effort applied to the shaft 27, will retard the revolution of same or stop it altogether. I apply and control this restraining or holding effort in the form of a friction brake, preferably of the multiple disc type, which however, must not be confused with a multiple disc clutch of similar design as its function is somewhat different. In general it simply resists and does not grip.

This friction brake consists essentially of a spider 29, mounted on and secured to worm shaft 27, said spider being splined on its outer periphery to receive a plurality of discs 30, alternating with a similar number of discs 31, in engagement with the splines on the interior of the cylindrical extension 24ª, of the gear case 24. The discs 30 rotate with the spider 29 but discs 31 are held against rotation by the cylindrical extension 24ª. All of the discs are movable axially. A pressure plate 32, carried by the spider 29, is provided with pins 33, which project through the face of said spider and are engaged by the radially extending arms of the bell cranks 34, mounted in lugs on the face of the spider 29. The horizontal arms of the bell cranks 34, are substantially parallel to the shaft 27 and are weighted at their outer ends as indicated at 35. The outer ends of these bell cranks 34 are also connected to the links 36, said links having their opposite ends pivoted on the axially movable collar 37. A compression spring 38 is interposed between the collar 37 and the hub of the spider 29 to restrain the axial movement of said collar. When the worm shaft 27 revolves, centrifugal force causes the weighted ends of the bell cranks 34 to fly outward but this movement is resisted by the action of the compression spring 38. The amount of movement is therefore dependent upon the speed of rotation of the shaft 27. Any outward movement of the weighted arms of the bell cranks 34 brings the radially extending arms into engagement with the pins 33 to force the pressure plate 32 against the discs 30 and 31 increasing the friction between them by compression and thus causing greater resistance to be offered to the rotation of the worm shaft 27. It will be evident that a point will be reached where the retarding action of the discs will just balance the turning effort exerted by the worm wheel and worm and the resultant speed will be maintained as long as the conditions remain unchanged. It may, however, be necessary to vary the speed automatically and this is accomplished by employing an adjustable axially movable pressure plate 39, against which the discs 30 and 31 abut instead of against the customary fixed surface. It will be seen that if the adjustable pressure plate 39 is moved toward the discs 30 and 31, a lower speed of rotation of the shaft 27 will cause sufficient compression of the said discs to retard the rotation of the said shaft 27. If, on the other hand, the adjustable pressure plate 39 is moved away from the discs 30 and 31, a higher speed of rotation of the shaft 27 will be necessary to cause sufficient pressure to retard the revolution of said shaft. To move the pressure plate 39 axially, I provide the said pressure plate with a relatively long hub 39ª which is threaded on the outside to receive the threaded bore of a small worm wheel 40. The hub 39ª is slidable axially in the smooth bore of the retaining plate 41, and in the smooth bore of the hub of the end cap 42. The pressure plate 39 is thus supported independent of the shaft 27 which passes through the relatively large bore in the hub 39ª without coming in contact with it. The worm wheel 40 is rotated by the mating worm 43, mounted on a shaft 44, journalled transversely in the end cap 42. On the outer end of the shaft 44, I have shown a direct connected motor 45, by means of which said shaft 44 may be automatically operated by remote electric control. It will be obvious however, that the pressure plate 39, may be adjusted for a relatively fixed speed of the shaft 27, by turning the shaft 44 by hand. Rotation of the motor 45 in one direction will cause the pressure plate 39 to move axially toward the discs 30 and 31 to cause a lower speed of rotation of shaft 27, while rotation of the motor in the opposite direction will move the pressure plate 39 away from the said discs and thus permit a higher speed of rotation of the shaft 27. The variation in the speed of the worm shaft 27 will cause a corresponding variation in the permissible revolution of the housing 4 and a consequent variation in the speed of the driven shaft 8, all as clearly described in the foregoing.

In Fig. 8, I show diagrammatically, a specific application of my device to one of several units of a paper making machine. But I do not wish to confine my invention to this particular field as there are many other requirements for a device of this character. In Fig. 8, a partial dryer unit is illustrated. My apparatus is direct connected to one of the shafts 46, of the drying unit by means of the flexible coupling 47, shown in Fig. 1. The web of paper 48 is deflected from its normal straight path from one of the drying rolls to another by the roller 49, extending across the entire face of the web. Roller 49 is supported by the swinging arms 50 mounted on a pivotal shaft 51, carried on the frame of the paper machine. Variation of the path of the web 48 at the point of contact with the roller 49 beyond certain limits indicated by dotted lines, will throw in a reversing switch 52 and cause the motor 45 to revolve in a direction to correct the tendency of the web 48, to become too loose or too taut as the case may be. In the diagram in Fig. 8, the switch 52 is shown reversing two phases of a three phase motor. As the power required to revolve the small worm 43 is very slight, a motor of the smallest size manufactured commercially can be used.

There may be cases, however, where fine regulation of the rotation of the variable speed driven shaft 8, is not so essential. In Fig. 7, I show a variable speed motor 53, directly connected to the worm shaft 27. It is obvious that if a rheostat or electric controller is substituted for the reversing switch 52 in Fig. 8, the variable speed motor 53, will be controlled in the same manner as the motor 45 in Fig. 2.

It will be understood that the gear case 24 contains sufficient oil to keep the worm wheel 21, worm 26 and all of the controlling mechanism mounted in said gear case, thoroughly lubricated at all times. Inasmuch as there will be a very low unit pressure on various elements of the friction brake, the lubricating oil will not be forced from between the contacting surfaces as is the case in a friction clutch of similar design. Wear will therefore be negligible and uniformity of action will result.

I have shown and described the preferred forms of my invention but one skilled in the art may design equivalent mechanical means to accomplish the same results as outlined, which will come within the scope of my invention. For example, a pulley, driven from some external variable speed source, may be substituted for the motor 53 in Fig. 7.

Having thus described my invention, I claim as new and desire to secure by Letters Patent:

1. In a device of the character described, a rotary shaft, a friction disk rotating with said shaft, a non-rotatable friction disk cooperating with said rotating friction disk, an abutment for limiting the axial displacement of said disks, a pressure ring between which and said abutment the friction disks are confined, means operating by centrifugal force for pressing said pressure ring against said disks, and means for adjusting said disks and resisting the displacement of said disks under the pressure imparted by said centrifugally operated means.

2. In a device of the character described, a rotary shaft, a friction disk rotating with said shaft, a non-rotatable friction disk cooperating with said rotating friction disk, means operating by centrifugal force for varying the pressure between said disks, an adjustable abutment for resisting the displacement of said disks under the pressure imparted by said centrifugally operated means, a reversible motor, and connections between said adjustable abutment and said motor.

3. In mechanism of the character described, the combination with a rotary shaft, of an axially adjustable abutment, an axially movable pressure ring, rotatable and non-rotatable friction rings confined between said abutment and pressure ring, a centrifugal governor mounted on said shaft and adapted to press upon said pressure ring, a reversible motor, and means operated by said motor for adjusting said abutment.

4. In mechanism of the character described, the combination with a rotary shaft, of rotatable and non-rotatable friction elements, a reversible motor, and means operated by said motor for varying the frictional resistance between said friction elements.

5. In mechanism of the character described, the combination with a power-driven shaft, of a spider secured to said shaft, friction disks splined to said spider, non-rotatable friction disks alternately disposed with respect to the first-mentioned friction disks, an axially movable abutment for said friction disks, a motor, means operated by said motor for adjusting said abutment, and means controlled by the speed of said shaft for pressing said friction disks towards said abutment.

6. In mechanism of the character described, the combination with a rotary shaft, of a friction disk splined thereto, a non-rotatable friction disk, an axially adjustable non-rotatable abutment, a pressure ring, said friction disks being axially confined between said abutment and pressure ring, means depending upon the speed of said shaft for imparting an axial movement to said pressure ring, a reversible motor, and means under the control of said motor for imparting an axial movement to said abutment.

7. In mechanism of the character described, the combination with a power-driven shaft, of a spider secured to said shaft, friction disks splined to said spider, non-rotatable friction disks alternately disposed with respect to the first-mentioned disks, axially movable pressure plates for pressing all of said disks together, centrifugal means revolving with said spider and operating on one of said pressure plates, a reversible motor, and means operated by said motor for varying the position of the other pressure plate.

8. In mechanism of the character described, the combination with a rotary shaft, of a friction disk rotatable therewith, a non-rotatable friction disk, said friction disks being coaxially arranged with respect to said shaft and axially movable with respect thereto, axially movable pressure plates for pressing said friction disks together, a centrifugal governor mounted on said shaft for imparting an axial movement to one of said pressure plates, and a reversible motor connected to the other of said pressure plates.

9. In mechanism of the character described, the combination with a power-driven shaft, of a spider secured to said shaft, friction disks splined to said spider, other friction disks respectively interposed between the first-mentioned disks, means for holding the second-mentioned disks against rotation, an abutment for limiting the axial displacement of said disks, centrifugal levers revolving with said spider for exerting variable pressure on said disks, a cross head slidable on said shaft and connected to said centrifugal levers, and a compression spring interposed between said spider and cross-head.

10. In mechanism of the character described, the combination with a power-driven shaft, of a spider secured to said shaft, friction disks splined to said spider, non-rotatable friction disks alternately disposed with respect to the first-mentioned disks, an abutment for limiting the axial displacement of said disks, centrifugal levers pivoted to said spider, and a pressure ring provided with axially presented pins reciprocable in said spider and in operating engagement with said centrifugal levers.

11. In mechanism of the character described, the combination with a rotary spider, of friction disks splined thereto, non-rotatable friction disks alternately arranged with respect to the first-mentioned disks, a reciprocable abutment, a worm wheel for reciprocating said abutment, a worm meshing with said worm wheel, a reversible motor for rotating said worm, an axially movable pressure ring operating in opposition to said abutment, and centrifugally operated levers pivotally mounted on said spider and engaging said pressure ring.

Signed at New York city, in the county of New York and State of New York, this 5th day of April, A. D. 1922.

MILTON T. WESTON.